United States Patent [19]

Fub et al.

[11] Patent Number: 4,914,984
[45] Date of Patent: Apr. 10, 1990

[54] CONTROL VALVE FOR BELT-DRIVE CONTINUALLY VARIABLE TRANSMISSION

[75] Inventors: Josef Fub, Elsdorf; Ernst Kohl, Cologne, both of Fed. Rep. of Germany

[73] Assignee: Ford Motor Company, Dearborn, Mich.

[21] Appl. No.: 290,327

[22] Filed: Dec. 27, 1988

[30] Foreign Application Priority Data

Feb. 4, 1988 [DE] Fed. Rep. of Germany ....... 3803201

[51] Int. Cl.$^4$ ............................................ B60K 41/12
[52] U.S. Cl. ........................................... 74/867; 74/872
[58] Field of Search ................... 74/867, 868, 872; 474/11, 12, 18, 28

[56] References Cited

U.S. PATENT DOCUMENTS

| | | | |
|---|---|---|---|
| 4,094,203 | 6/1978 | van Deursen et al. | 474/28 |
| 4,152,947 | 5/1979 | van Deursen et al. | 474/28 X |
| 4,467,674 | 8/1984 | van Deursen et al. | 74/867 |
| 4,519,790 | 5/1985 | Yamamuro et al. | 474/18 |
| 4,616,530 | 10/1986 | Tanaka et al. | 74/872 X |
| 4,627,313 | 12/1986 | Sakai | 74/867 |
| 4,651,595 | 3/1987 | Miyawaki | 474/28 X |
| 4,671,140 | 6/1987 | Koshio | 74/868 |
| 4,680,991 | 7/1987 | Miyawaki | 74/868 |
| 4,730,523 | 3/1988 | Takahashi | 74/868 |
| 4,768,632 | 9/1988 | Moan | 192/3.3 |

FOREIGN PATENT DOCUMENTS 0158370 10/1985 European Pat. Off. .
2703487 12/1987 Fed. Rep. of Germany .

Primary Examiner—Dwight G. Diehl
Attorney, Agent, or Firm—Frank G. McKenzie; Donald J. Harrington

[57] ABSTRACT

A control valve arrangement for a continually variable transmission includes a first valve for regulating pressure in a primary servo for the gear ratio of the transmission and a second valve for regulating pressure in a secondary servo controlling tension of the drivebelt. These valves are acted upon by a throttle shaft as a function of output torque of the engine. A modulating device varies pressure in the secondary servo as a function of the gear ratio and of engine torque. The modulating device comprises a lever having one end acted upon by a cam disk as a function of the engine torque and second end acted upon by a valve element of the second regulating valve. The second lever is extended radially outward from a pivot. A sensor arm acts as a function of the gear ratio on one end of the second lever, whose other end is rotatably pinned to the first lever.

14 Claims, 6 Drawing Sheets

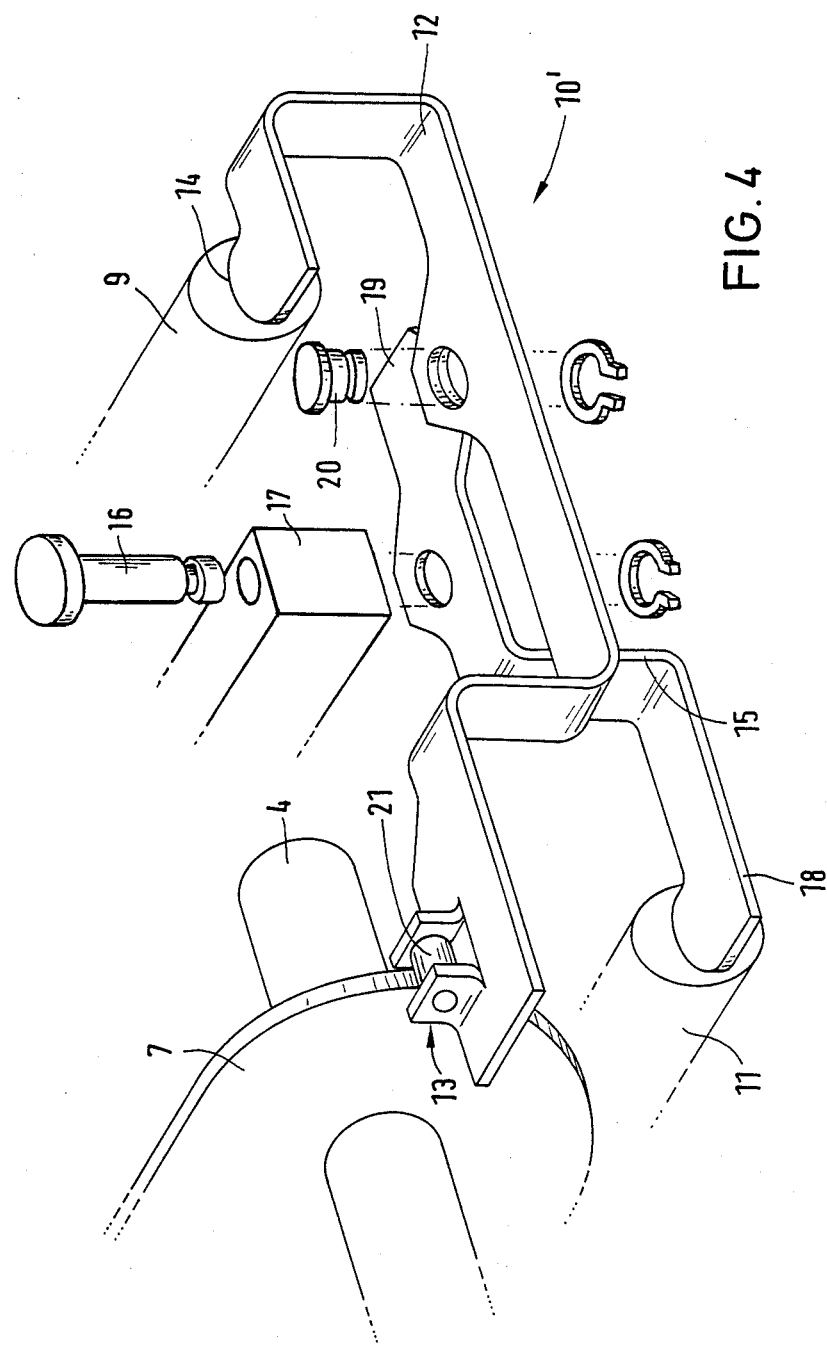

$\alpha = -\text{Arc sin}(Y_H/L1)$
$Y_Q = Y_H \cdot L4 \cdot \cos(\delta)/L1 + L4 \cdot \sin(\delta) \cdot \cos(\alpha)$ $\alpha = \text{Arc sin}(Y_H/L1)$
$Y_S = L4 \cdot \sin(\alpha + \delta)$
$EPS = -\text{Arc sin}((Y_R - Y_S)/L5)$
$Y_Q = Y_S + L8 \cdot \sin(EPS + RHO)$

1

CONTROL VALVE FOR BELT-DRIVE CONTINUALLY VARIABLE TRANSMISSION

BACKGROUND OF THE INVENTION

1. Field of the Invention

This invention relates to the field of hydraulic controls for a continually variable transmission.

2. Prior Art

German Patent No. 27 03 487 describes a control valve arrangement for a continually variably transmission. A first regulating valve for determining pressure in the primary servo sets the gear ratio of the belt-drive transmission. A second regulating valve for determining pressure in the secondary servo sets tension in the drive belt. The first of the two regulating valves is acted on as a function of engine speed and torque of the driving engine by a cam disk arrangement actuated by the throttle shaft. The second regulating valve is acted on by a sensor rod connected to the primary servo, whose position is a function of the operating gear ratio of the transmission.

A disadvantage of this control valve arrangement is that the control pressure in the secondary servo is related to the transmitted torque only by a minimum secondary pressure provided for transmitting maximum torque. Consequently, secondary servo pressure is far too high in the underload range where torque is low. Therefore, the components of the transmission, particularly the rotating drive belt, which may be a sliding link belt, is subjected to unnecessarily high load and stress. A fluid pressure pump is required also to produce unnecessarily high pressure, as a result of which the efficiency of the transmission is adversely affected and fuel consumption is increased.

European Patent No. 0158370 describes a control valve arrangement for a continually variable belt-drive transmission in which the control valves are similar to those of the '487 patent. However, patent '370 includes a modulating valve, which varies pressure in the secondary servo as a function of engine torque. The additional modulating valve is acted upon by a siphon diaphragm as a function of vacuum in the intake manifold of the engine. Therefore, in addition to the modulating valve, the siphon diaphragm and corresponding connecting lines are also required. Furthermore, exhaust gas recirculation required in modern engines to lower the level of contaminants in engine exhaust causes intake manifold vacuum to be an unreliable indication of torque delivered by the engine.

SUMMARY OF THE INVENTION

An object of the invention is to provide a modulating device for pressure in the secondary servo of a continually variable transmission by including a substantially similar mechanical lever arrangement to that of a conventional two-armed lever such that no modification is required to the existing housing within which the control valves are located.

The device for modulating pressure in the secondary servo according to the present invention is constructed in the form of a lever arrangement comprising a first lever actuated as a function of engine torque and a second lever actuated as a function of gear ratio. A cam disk located on the engine camshaft, next to the throttle shaft, actuates the first lever. A sensor rod acts upon a valve for regulating pressure in the second servo. The second lever is mounted on the control housing pivotably about a fixed pin rotatably connected by its free ends to the first lever, which acts with its free ends upon the second valve for regulating pressure in the secondary servo. Movement of the second lever in response to the gear ratio is overridden by movement of the first lever in accordance with the position of the throttle valve. Therefore, output torque of the engine is converted to a force that acts upon the second valve for regulating pressure in the secondary servo.

This overriding action results by a suitable choice of lever ratio and through operation of a cam disk acting upon the first lever so an optimum nominal magnitude of secondary pressure is achieved in the underload range of the drive belt. Transmitting movement of the cam disk to the first lever is preferably performed by a friction reducing roller arrangement.

BRIEF DESCRIPTION OF THE DRAWINGS

The invention is explained in greater detail with reference to an embodiment illustrated in the accompanying drawings.

FIG. 4 is an isometric view of a lever arrangement according to the present invention.

DESCRIPTION OF THE PREFERRED EMBODIMENT

Figure 1:
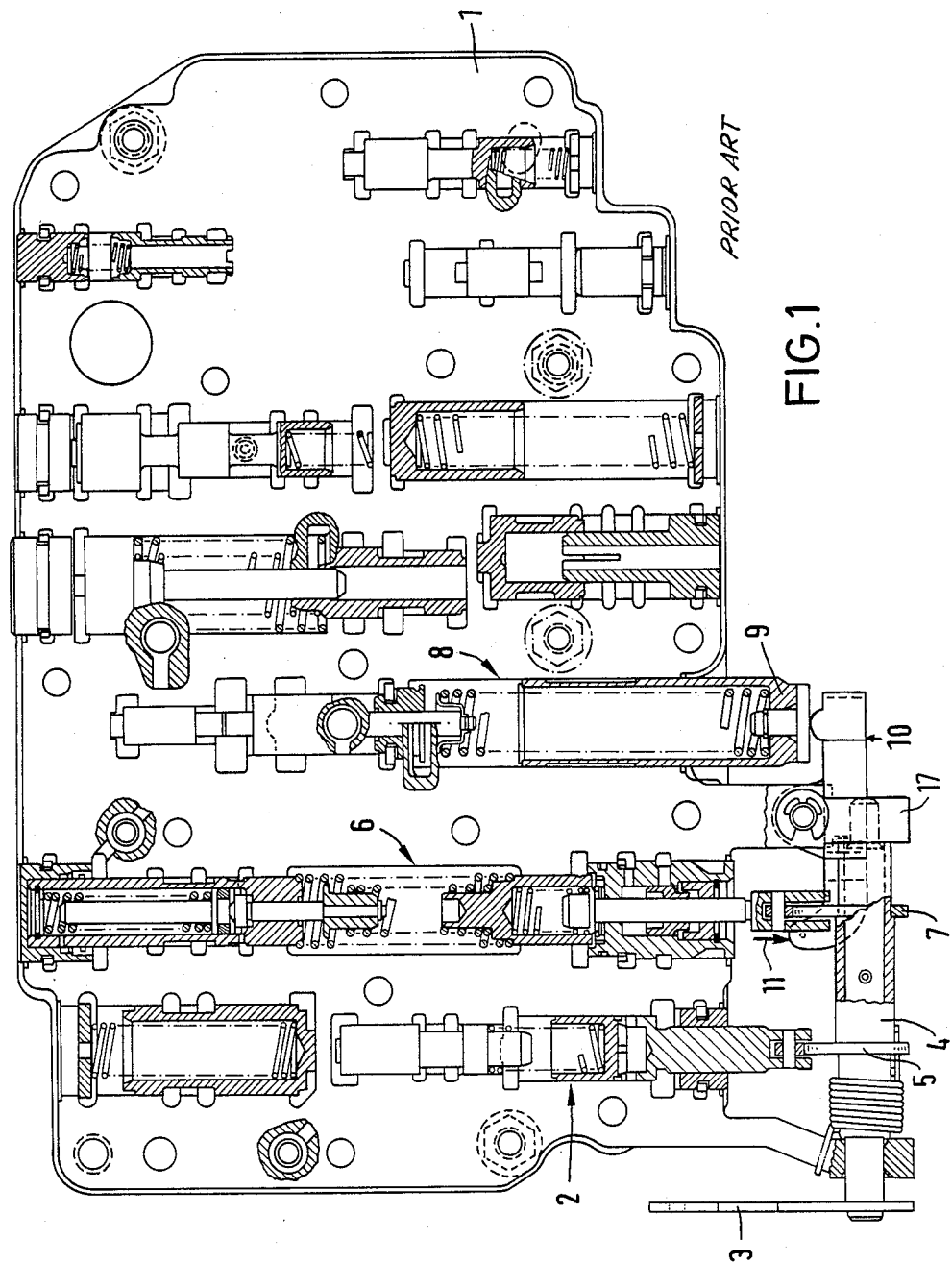
FIG. 1 is a plan view of hydraulic control valves used to operate a continually variable transmission.

An example of a cone-pulley belt-drive transmission suitable for use with the control of the present invention is described in U.S. Pat. No. 4,768,632, the entire disclosure of which is incorporated herein by reference.

A control valve assembly for a continually variable belt-drive transmission includes control valve housing 1, which contains several regulating, gearshift, and modulating valves. Located at the left-hand side in the control valve housing is regulating valve 2 for regulating either throttle pressure or auxiliary pressure. Valve 2 includes a valve element actuated, as a function of torque produced by an internal combustion engine, by camshaft 4, connected by lever 3 to the throttle shaft of the engine, and a cam disk 5 mounted on the camshaft.

Primary shaft valve 6, or first regulating valve, located adjacent valve 2, determines the magnitude of pressure in the primary servo, which magnitude sets the gear ratio of the belt-drive transmission. An element of first regulating valve 6 is actuated as a function of the torque of the engine by a cam disk 7 mounted on camshaft 4. Valve 6 performs a similar function to that of valve 320 of the '632 patent.

Adjacent cam disk 7 is the secondary valve 8, or second regulating valve, which determines the magnitude of pressure in a secondary servo that maintains necessary tension in the drive belt for transmitting torque between the sheaves on which the belt is supported rotatably. Valve 8 performs a similar function to that of valve 346 of the '632 patent. Valve element 9 of the second regulating valve 8 is normally actuated by a lever 10 that includes a sensor arm 11, directly connected mechanically to one of the movable cone pulleys of the transmission. Consequently, its position indicates the operating gear ratio of the belt-drive transmission.

Pressure in the secondary servo is therefore regulated only in an approximately linear manner with the gear ratio. As a result, in a circulating belt excessive pressure increases load and stress which reduce efficiency of the transmission while operating in the underload or low torque range.

Figure 2:
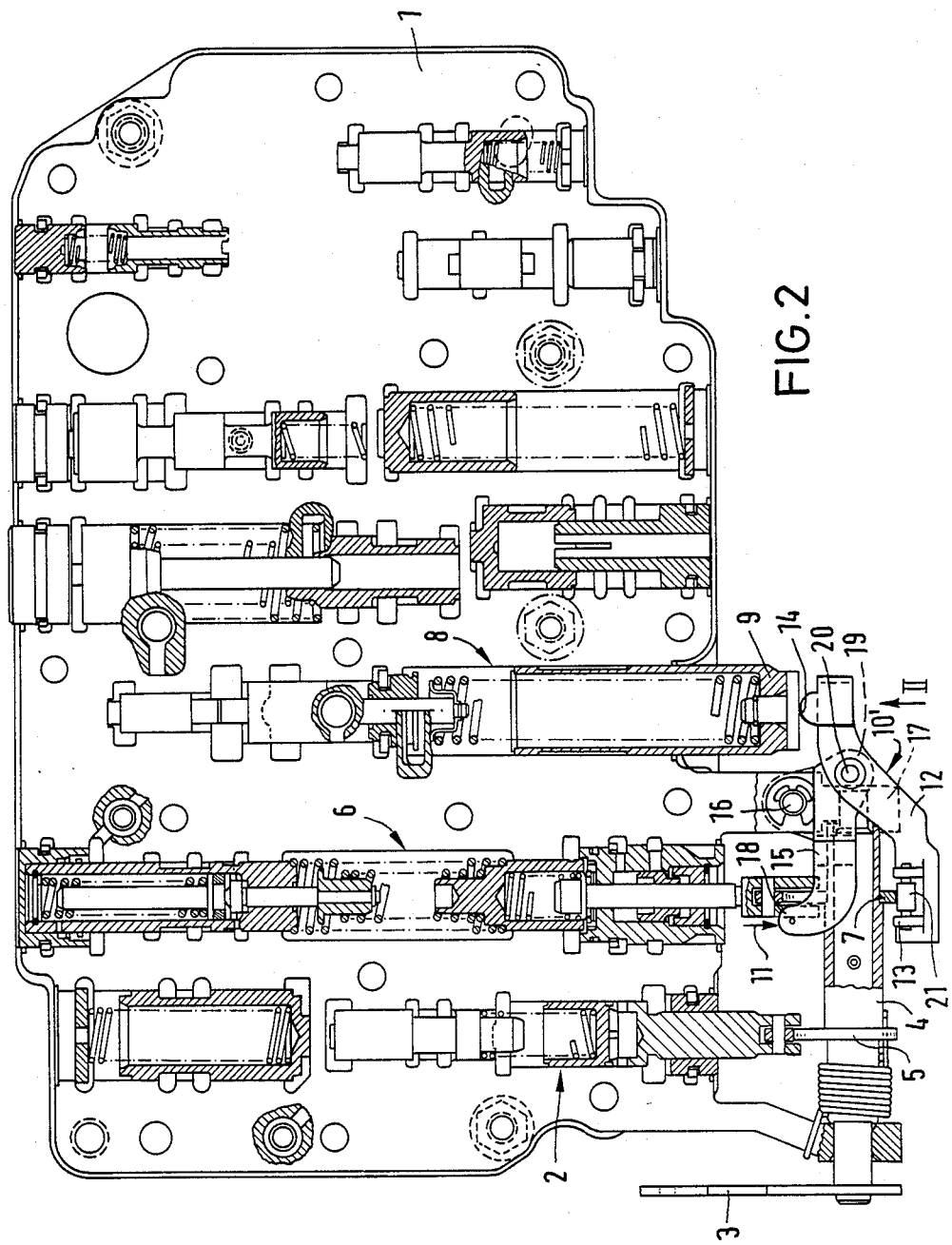
FIG. 2 is a plan view of control valve arrangement for a continually variable transmission including the modulating device for pressure in the secondary servo according to the present invention.
Figure 3:
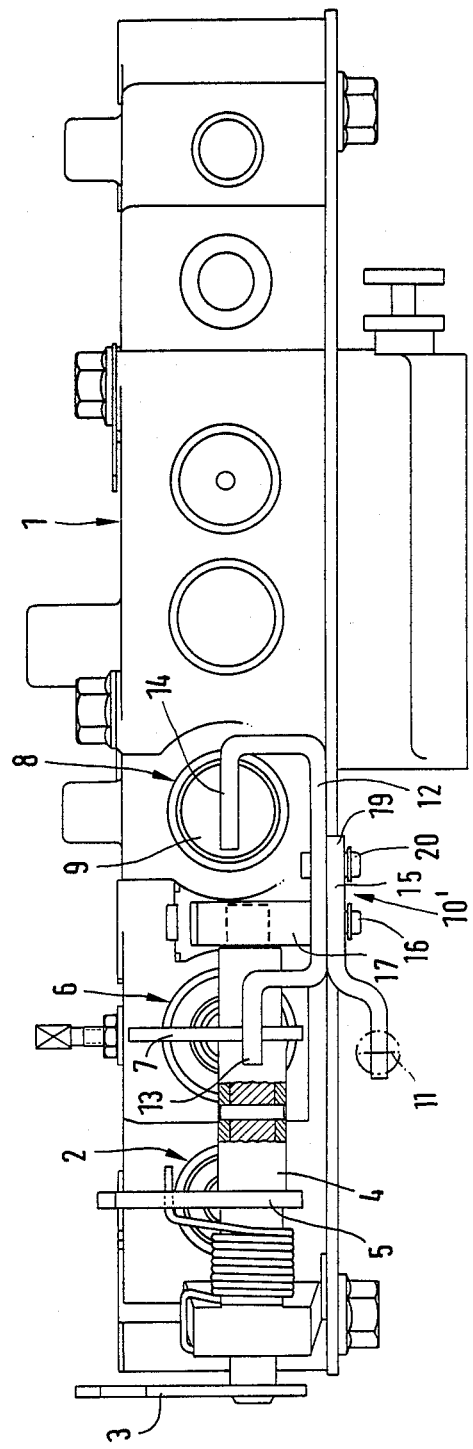
FIG. 3 is a side view of the housing of the control valve arrangement of FIG. 2 viewed in the direction of arrow II.

FIG. 2 shows a modification according to the present invention of a lever arrangement 10', which includes first lever 12 actuated at one of its ends 13 as a function of engine torque by way of a modified cam disk 7 mounted on camshaft 4. The rear side of the cam disk is formed with a control edge. The other end 14 of lever 12 acts on valve element 9 of second regulating valve 8. The first lever 12 is acted upon by a second lever 15, mounted rotatably about a fixed pin 16 supported on the control valve housing. Sensor rod 11 is connected to a displaceable pulley, such as pulley 52 or 78 of the '632 patent. Therefore, the position of rod 11 is dependent upon the gear ratio of the transmission. Rod 11 engages one end 18 of second lever 15. The other end 19 of lever 15 is connected rotatably to first lever 12 by a pin 20. This arrangement is seen best in FIGS. 2, 3, 4 and 5b.

The two levers 12 and 13 are preferably constructed from simple pressed sheet metal, having ends rounded in the areas where they cooperate with the connecting element, or ends provided with a roller to reduce friction, such as roller 21.

Through operation of the lever arrangement according to this invention, an overriding action takes place between movement caused by gear ratio changes and movement derived from torque delivered by the engine. In this way, pressure produced in the secondary servo is only as high as necessary to transmit torque.

Figure 5A:
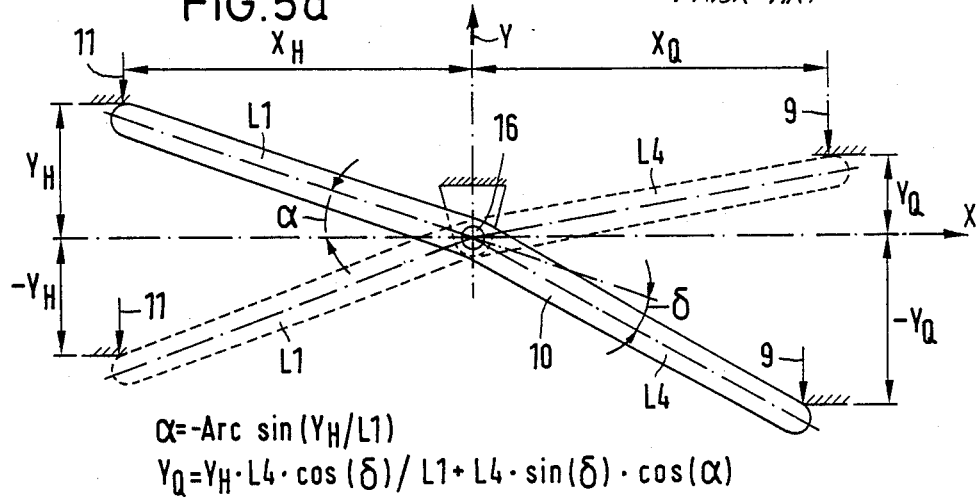
FIGS. 5a and 5b are schematic illustrations of two-lever arrangements.

FIG. 5a illustrates the conventional lever arrangement in which sensor rod 11 contacts lever arm L1 of a two-armed lever, which acts with its other lever arm L4 on the actuating member 9 of the second regulating valve 8.

The effective operating links of the first lever arm L1 is $X_H$ and that of the second lever arm L4 is $X_Q$. Movement that represents gear ratio regulation of the transmission initiated by sensor rod 11 is labeled $+Y_H$ and $-Y_H$. Relative to a coordinate system whose abscissa is X and ordinate Y, lever arm L1 forms an angle alpha with the abscissa and lever arm 4 forms an angle delta with the axis of lever arm L1. Distances from the origin, through which the actuating member of the second regulating valve 8 moves, are $+Y_Q$ and $-Y_Q$, derived in accordance with the formulas of FIG. 5a.

Figure 5B:
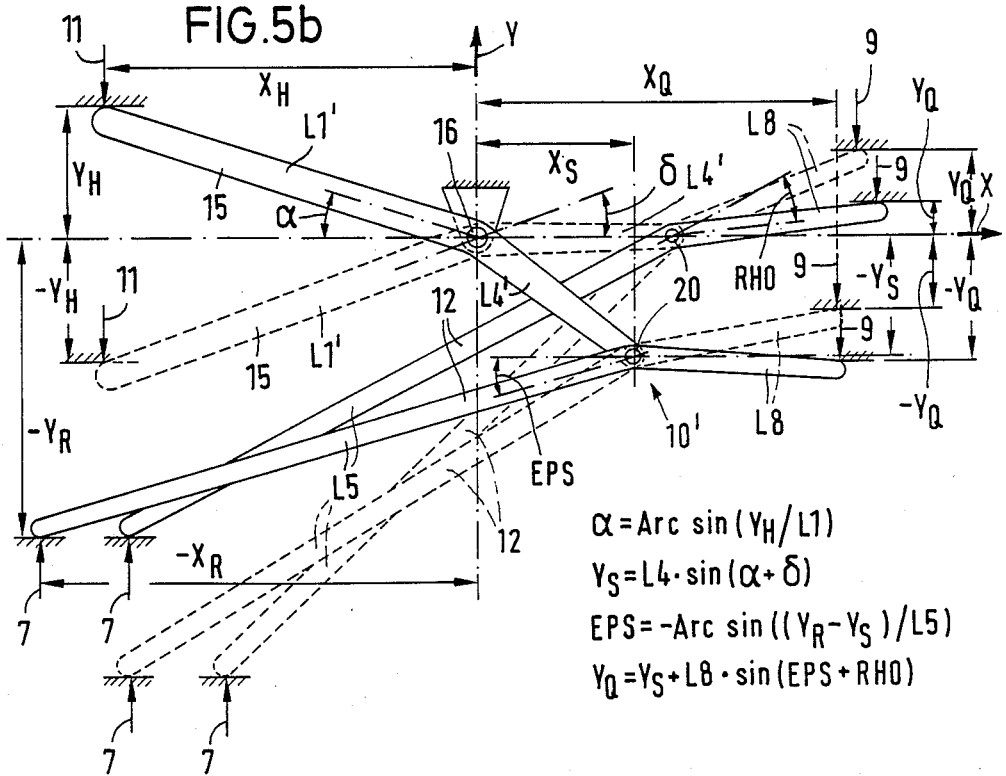

Corresponding movements produced by the lever according to this invention are illustrated in FIG. 5b. Sensor rod 11 acts on the two-arm lever 15, pivoted at 16 and having two arms L1' and L4' extending outward from the pivot. Arm L4' is inclined at angle delta relative to the axis of arm L1'.

The free end of second lever arm L4' supports a pivot pin 20 on which lever 12 is supported rotatably. Lever 12 has arms L5 and L8 extending outward from pivot 20. Cam disk 7 moves in accordance with the output torque produced by an engine and engages the end of lever arm L5. Arm L8 acts upon the actuating member 9 of the second regulating valve 8. Levers 15 and 12 are shown in FIG. 5b with a solid line, when arms L1' and L5 are at their maximum vertical positions, and in broken line, when arms L8 and L4' are at their maximum vertical positions.

It is clear from the paths of travel of the free ends of lever arm 8 that actuating member 9 of the second regulating valve is acted upon both as a function of the gear ratio of the transmission and as a function of the torque of the engine. The corresponding actuating paths can be derived with the formulas shown in FIG. 5b. Additional control parameters can be produced because the circular surfaces on the ends of levers 12 and 15 have different positions on the contact surfaces 14 and 18, which cooperate with corresponding surfaces of piston 9 and sensor 11, respectively.

Figure 6:
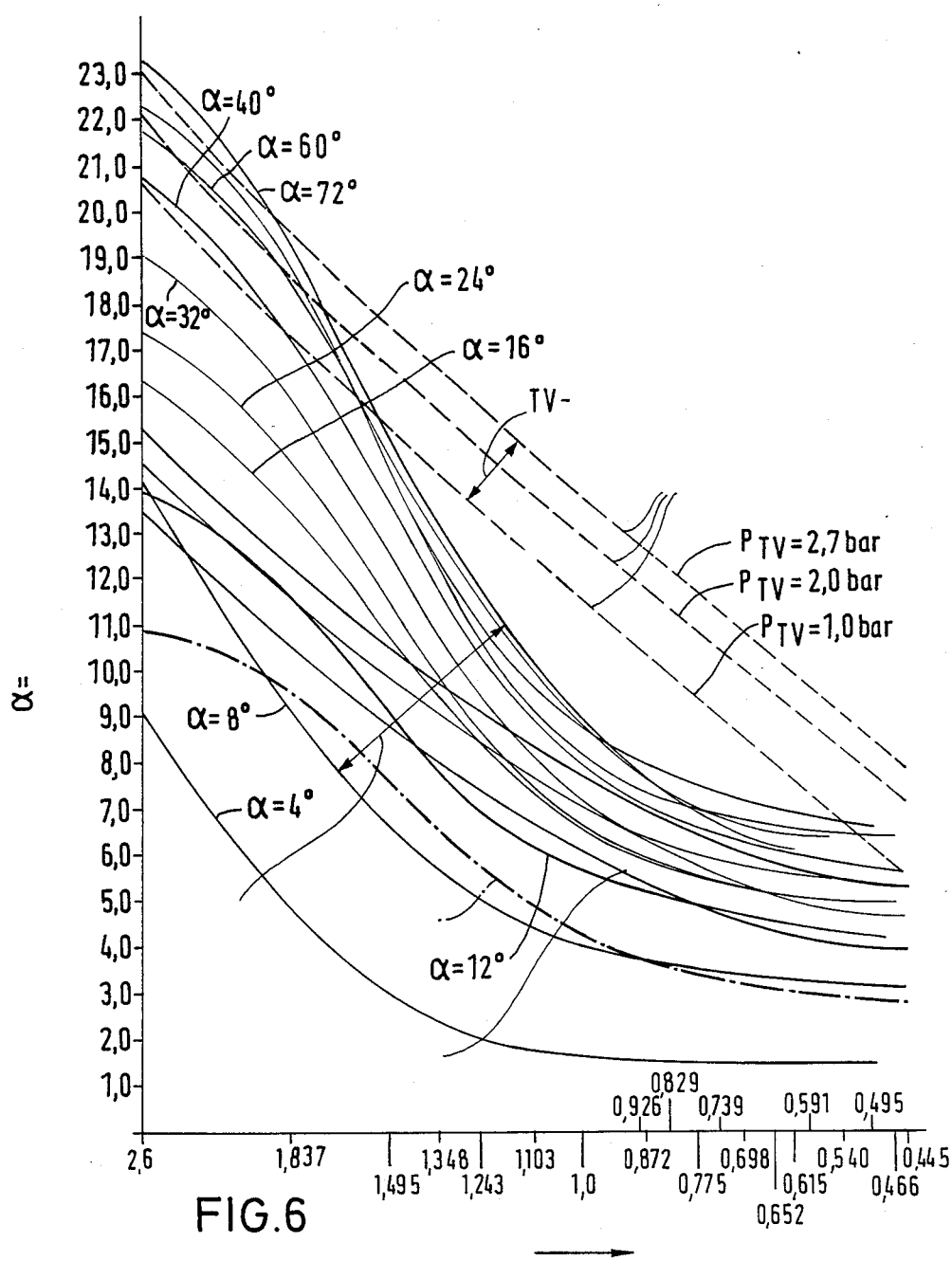
FIG. 6 is a diagram showing the relationship between secondary pressure and gear ratio of the transmission for various engine throttle positions.

FIG. 6 is a diagram that relates secondary pressure, the ordinate, to the operating gear ratio of the transmission, the abscissa, for a range of throttle valve opening angles alpha. The pressure lines resulting from the conventional control discussed with reference to FIG. 1 are dash lines 22; secondary pressure resulting from modulation according to the present invention are solid lines. Preferably, operating below line 26 is avoided. That line represents sliding operation of the secondary pressure.

A major portion of operation of the driving belt occurs in the underload range. The belt is loaded to a substantially lower magnitude than with conventional controls known in the prior art. Furthermore, the magnitude of pressure is lower so the overall efficiency of the drive-belt transmission is improved and fuel consumption is reduced. Scratching noises, which occur in continually variable transmissions in the underload range near the highest gear ratio during high contact pressure conditions, are avoided. It has been discovered that a slight reduction in secondary servo pressure of approximately two bars, in comparison to the higher pressure of conventional control system, eliminates the disturbing scratching noises.

Having described a preferred embodiment of our invention, what we claim and desire to secure by U.S. Letters Patent is:

1. A system for controlling operation of a continually variable transmission comprising:
   a flexible, endless drive belt;
   a primary shaft driven by an engine, said shaft rotatably supporting a fixed conical pulley and an axially displaceable conical pulley moveable along said shaft, the pulleys engaging the drive belt at a radial position relative to the axis of the shaft that varies with the position of the displaceable pulley;
   a secondary shaft driven by the belt, the second shaft rotatably supporting a fixed conical pulley and an axially displaceable conical pulley moveable along the second shaft, the pulleys on the second shaft engaging the drive belt at a variable radial position relative to the axis of the second shaft;
   first valve means for regulating pressure that causes displacement of the pulleys and sets the operating transmission gear ratio including a valve element whose position determines a magnitude of pressure;
   second valve means responsive to the position of said valve element for producing pressure that sets tension in the drive belt;
   means for producing a first variable reference responsive to the magnitude of torque delivered to the transmission;

means for producing a second variable reference responsive to the operating gear ratio of the transmission; and means for regulating pressure produced by the second valve means responsive to the first variable reference and the second variable reference including a first lever having a first arm actuated by the first reference producing means and a second arm contacting the element of the second valve means, and a second lever having a first arm actuated by the second reference producing means and a second arm carrying a first pivot on which the first lever is supported, the second lever being mounted on a second pivot and connected to the first lever eccentric of the first pivot.

2. The system of claim 1 further comprising an engine driveably connected to the first shaft, and wherein the first variable reference means includes:

means for producing a variable position indication of the magnitude of torque produced by the engine;

a camshaft connected to the engine torque indicating means mounted for rotation about its axis;

a cam disc fixed to the camshaft for rotation therewith; and a cam follower contacting the cam disc including a roller rotatably mounted on the first arm of the first lever.

3. The system of claim 1 wherein the second variable reference means includes a sensor shaft connected to a displaceable pulley of the first shaft or the second shaft.

4. A system for controlling operation of a continually variable transmission comprising:

a flexible, endless drive belt;

a primary shaft driven by an engine, said shaft rotatably supporting a fixed conical pulley and an axially displaceable conical pulley moveable along said shaft, the pulleys engaging the drive belt at a radial position relative to the axis of the shaft that varies with the position of the displaceable pulley;

a secondary shaft driven by the belt, the second shaft rotatably supporting a fixed conical pulley and an axially displaceable conical pulley moveable along the second shaft, the pulleys on the second shaft engaging the drive belt at a variable radial position relative to the axis of the second shaft;

valve means for producing pressure that sets tension in the drive belt including a valve element whose position determines the magnitude of pressure produced by the valve means;

means for producing a first variable reference responsive to the magnitude of torque delivered to the transmission;

means for producing a second variable reference responsive to the operating gear ratio of the transmission; and means for regulating pressure produced by the valve means responsive to the first variable reference and the second variable reference including a first lever having a first arm actuated by the first reference producing means and a second arm contacting the element of the valve means, and a second lever having a first arm actuated by the second reference producing means and a second arm carrying a first pivot on which the first lever is supported, the second lever being mounted on a second pivot and connected to the first lever eccentric to the first pivot.

5. The system of claim 4 further comprising an engine driveably connected to the first shaft, and wherein the first variable reference means includes:

means for producing a variable position indication of the magnitude of torque produced by the engine;

a camshaft connected to the engine torque indicating means mounted for rotation about its axis;

a cam disc fixed to the camshaft for rotation therewith; and a cam follower contacting the cam disc including a roller rotatably mounted on the first arm of the first lever.

6. The system of claim 4 wherein the second variable reference means includes a sensor shaft connected to a displaceable pulley of the first shaft or the second shaft.

7. A system for controlling operation of a stepless, continually variable gear ratio, belt-drive transmission adapted for driveable connection to a engine having an displaceable measure of torque delivered to the transmission, comprising:

first valve means for regulating pressure that sets the operating transmission gear ratio;

second valve means for producing pressure that sets tension in the drive belt including a valve element whose position determines the magnitude of pressure produced by the second valve means;

means for producing a first variable reference responsive to the magnitude of torque delivered to the transmission;

means for producing a second variable reference responsive to the operating gear ratio of the transmission; and means for regulating pressure produced by the second valve means responsive to the first variable reference and the second variable reference including a first lever having a first arm actuated by the first reference producing means and a second arm contacting the element of the second valve means, and a second lever having a first arm actuated by the second reference producing means and a second arm carrying a first pivot on which the first lever is supported, the second lever being mounted on a second pivot and connected to the first lever eccentric of the first pivot.

8. The system of claim 7 wherein the first variable reference means includes:

means for producing a variable position indication of the magnitude of torque produced by the engine;

a camshaft connected to the engine torque indicating means mounted for rotation about its axis;

a cam disc fixed to the camshaft for rotation therewith; and a cam follower contacting the cam disc including a roller rotatably mounted on the first arm of the first lever.

9. The system of claim 7 wherein the second variable reference means includes a sensor shaft whose position represents the operating gear ratio of the transmission.

10. The system of claim 7 further comprising:

a third valve means for producing throttle valve pressure including a valve element whose position determines the magnitude of pressure produced by the third means;

a second cam disc fixed to camshaft of the engine for rotation therewith and contacting the element of the third valve means.

11. A system for controlling operation of a stepless, continually variable gear ratio, belt-drive transmission adapted for driveable connection to a engine having an displaceable measure of torque delivered to the transmission, comprising:

first valve means for producing pressure that sets tension in the drive belt including a valve element whose position determines the magnitude of pressure produced by the first valve means;

means for producing a first variable reference responsive to the magnitude of torque delivered to the transmission;

means for producing a second variable reference responsive to the operating gear ratio of the transmission; and means for regulating pressure produced by the valve means responsive to the first variable reference and the second variable reference including a first lever having a first arm actuated by the first reference producing means and a second arm contacting the element of the valve means, and a second lever having a first arm actuated by the second reference producing means and a second arm carrying a first pivot on which the first lever is supported, the second lever being mounted on a second pivot and connected to the first lever eccentric of the first pivot.

12. The system of claim 11 wherein the first variable reference means includes:

means for producing a variable position indication of the magnitude of torque produced by the engine;

a camshaft connected to the engine torque indicating means mounted for rotation about its axis;

a cam disc fixed to the camshaft for rotation therewith; and a cam follower contacting the cam disc including a roller rotatably mounted on the first arm of the first lever.

13. The system of claim 11 wherein the second variable reference means includes a sensor shaft whose position represents the operating gear ratio of the transmission.

14. The system of claim 11 further comprising:

second valve means for producing throttle valve pressure including a valve element whose position determines the magnitude of pressure produced by the second valve means;

a second cam disc fixed to a camshaft of the engine for rotation therewith and contacting the valve element of the second valve means.

* * * * *